United States Patent [19]
Yamaguti

[11] 4,333,087
[45] Jun. 1, 1982

[54] INK-JET RECORDING DEVICE

[75] Inventor: Yasuhiro Yamaguti, Tokyo, Japan

[73] Assignee: Tokyo Shibaura Denki Kabushiki Kaisha, Kawasaki, Japan

[21] Appl. No.: 168,253

[22] Filed: Jul. 10, 1980

[30] Foreign Application Priority Data

Jul. 18, 1979 [JP] Japan .................................. 54/90362

[51] Int. Cl.[3] .............................................. G01D 15/18
[52] U.S. Cl. .................................................. 346/140 R
[58] Field of Search ............... 346/75, 140 IJ, 140 PD

[56] References Cited

U.S. PATENT DOCUMENTS

| | | | |
|---|---|---|---|
| 3,953,862 | 4/1976 | Amberntsson et al. | 346/140 PD |
| 4,106,032 | 8/1978 | Miura et al. | 346/140 PD |
| 4,183,029 | 1/1980 | Isayama et al. | 346/140 IJ |
| 4,233,610 | 11/1980 | Fischbeck et al. | 346/140 PD |

*Primary Examiner*—George H. Miller, Jr.
*Attorney, Agent, or Firm*—Oblon, Fisher, Spivak, McClelland & Maier

[57] ABSTRACT

Ink-jet recording device includes an ink chamber for accommodating an ink body from which ink is jetted through a nozzle by applying a pressure and to which ink is supplied from an ink source through an ink inlet port. A porous filter is provided in the ink inlet port near the ink chamber, through which ink flows into the ink chamber.

5 Claims, 5 Drawing Figures

INK-JET RECORDING DEVICE

BACKGROUND OF THE INVENTION

This invention relates to an ink-jet recording device used for printers, facsimile telegraphs, recorders, etc.

Generally known are various types of ink-jet recording systems to perform recording by ejecting drops of ink. As a typical example of such system, there is a pressurization-type ink-jet system in which voltage is applied to a piezoelectric element to distort the same, thereby applying pressure to ink to eject drops of ink. Such ink-jet system may be classified into two types; a pressure-pulse type system to apply voltage to a piezoelectric element only at recording and a pressurized and electrostatically deflected type system to charge-deflect a train of droplets into which a jet stream continually spouting under constant static pressure is split by the oscillation of the piezoelectric element. Referring now to the drawing of FIG. 1, there will be described an example of the pressure-pulse type system.

Pulse voltage of hundreds volts is applied between an electrode 2 and a metal plate 3 disposed respectively on both sides of a piezoelectric element 1 by a pulse generator 4. By the impression of such voltage, the central portion of the piezoelectric element 1 is distorted so as to project in the direction of arrow A to apply given pressure to ink body 6 in an ink chamber 5. By such pressurization, part of the ink body 6 is fractionized into drops and jetted from a nozzle 7. When a pulse signal from the pulse generator 4 falls, on the other hand, the central portion of the piezoelectric element is restored so as to move in the direction of arrow B to produce negative pressure in the ink chamber 5. As a result, ink is automatically fed into the ink chamber 5 through an ink supply inlet 8. By repeating such operation, the drops of ink are successively jetted out from the nozzle 7 for recording.

In the above-mentioned ink-jet recording device, pressure produced by the distortion of the piezoelectric element 1 in the direction of arrow A is applied not only toward the nozzle side but also toward the ink supply inlet side, leading to an entire loss of pressure. Accordingly, if ink is jetted from a nozzle with an inner diameter of approximately 50 μm by using a disk-like piezoelectric element of 20-mm diameter and 0.2-mm thickness and a metal plate with the same thickness, for example, impression of pulse voltage of 300-V peak value will not be able to eject ink drops or to produce low frequency of an ink jetting.

SUMMARY OF THE INVENTION

The object of this invention is to provide an ink-jet recording device capable of satisfactory recording with improved ink jetting efficiency.

DETAILED DESCRIPTION OF THE PREFERRED EMBODIMENTS

Now there will be described an ink-jet recording device according to an embodiment of this invention with reference to the accompanying drawings.

Figure 1:
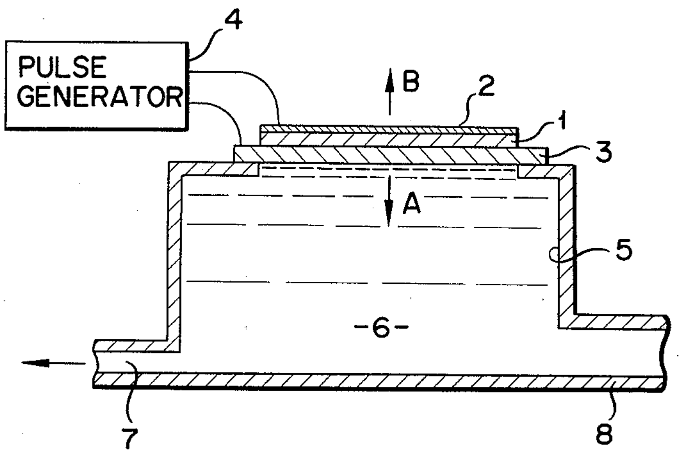
F I G. 1 PRIOR ART
FIG. 1 schematically shows a prior art ink-jet recording device.
Figure 2:
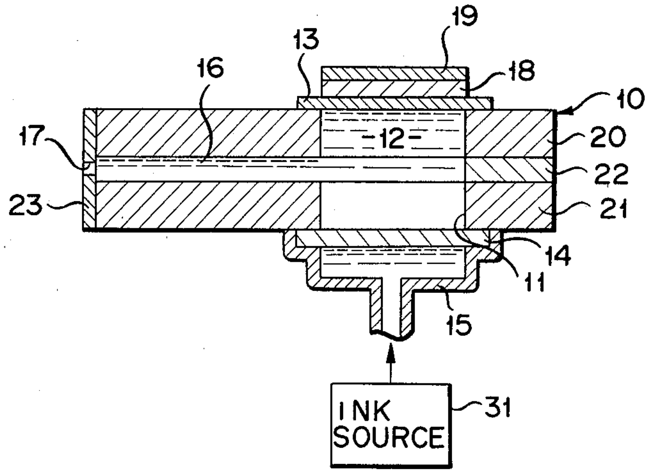
FIGS. 2 and 3 are an enlarged sectional view and a disassembled perspective view of an ink-jet recording device according to an embodiment of this invention, respectively.
Figure 3:
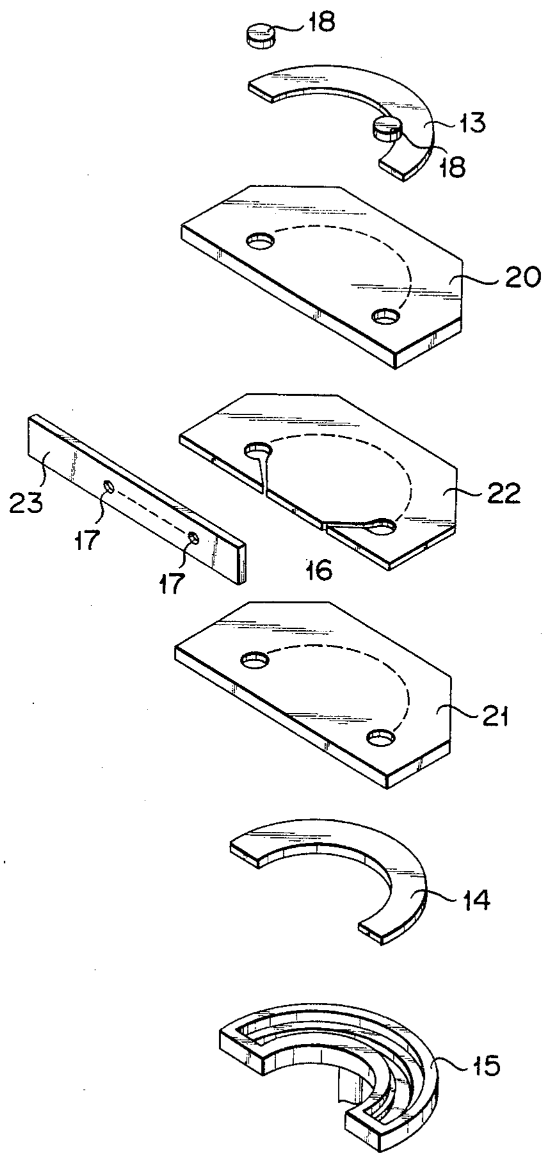

In FIGS. 2 and 3, an ink chamber 11 containing conventional water ink body 12 is defined in a container designated by numeral 10. The top opening of the ink chamber 11 is closed liquid-tightly by an electrode plate 13 formed of a stainless steel plate, while the bottom opening is fitted with a filter 14 formed of e.g. sintered stainless steel which has a number of continuous through holes. Further, the bottom opening of the container 10 is connected with an ink inlet port 15 coupled to an ink source 31 so as to communicate with the ink chamber 11 through the filter 14. The container 10 is provided with an ink outlet port 16 which communicates with one side of the ink chamber 11, the forward end of the port 16 extending to the outside through a nozzle 17. The electrode plate 13 is fitted with the bottom face of a piezoelectric element 18 through a silver film (not shown), the element formed of a disk-like piezoelectric ceramic material, and provided with another electrode plate 19 on the upper face thereof.

The container 11, as shown in detail in FIG. 3, is composed of upper and lower baseplates 20 and 21 each having a plurality of cylindrical through holes arranged in an arc, and a spacer 22 having through holes corresponding to the through holes in the baseplates 20 and 21 and sandwiched between the baseplates. The spacer 22 has a plurality of slits which extend from the through holes to front end face of the spacer. The spacer 22 is interposed between the baseplates 20 and 21 so that the front end face of the spacer may be flush with the respective front end faces of the baseplates 20 and 21. These front end faces are fitted with an orifice plate 23 having orifices which are formed in a row so as to communicate respectively with the slits of the spacer 22. Thus, the two baseplates 20 and 21 and the respective through holes of the spacer 22 define a plurality of ink chambers 11 (only one of these shown in FIG. 2), each slit of the spacer 22 and the under surface of the upper baseplate 20 and the top face of the lower baseplate 21 facing the slit define the ink outlet port, and each orifice of the orifice plate 23 forms the nozzle 17.

A step portion is formed at the ink inlet port 15 in the vicinity of the ink chamber 11. An arched porous plate or filter 14 is held between the step portion and the under surface of the lower baseplate 21 so as to block up together the bottom openings of the plurality of ink chambers. Thus, ink from the ink inlet port 15 may be introduced into the individual ink chambers 11 through the filter 14.

The electrode plate 13 is arched, and is attached to the top face of the upper baseplate 20 so as to close all the ink chambers 11 together. Arranged in an arc on the upper baseplate 20 are piezoelectric elements 18 which have substantially the same diameter as that of the ink chambers 11, that is, as that of the cylindrical through holes of the baseplate, and are on the same axes with their corresponding ink chambers.

Figure 4:
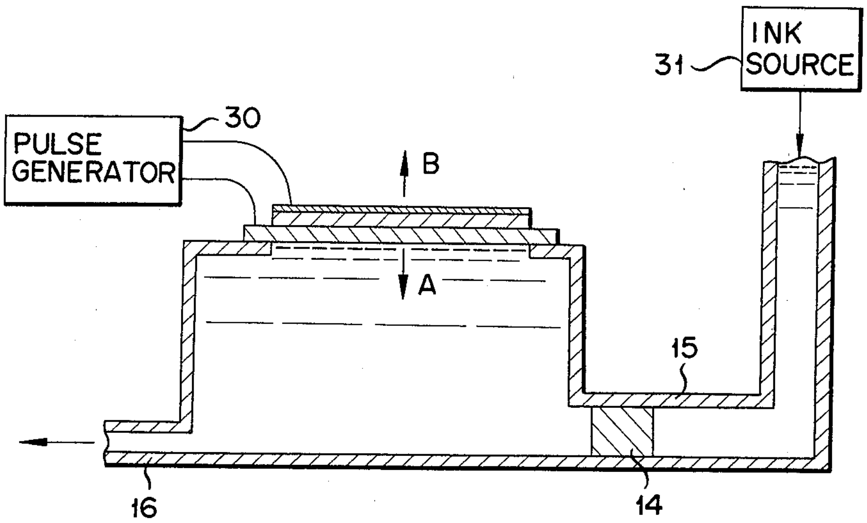
FIG. 4 is a schematic diagram for illustrating the operation of the ink-jet recording device of FIG. 2.

Referring now to FIG. 4 briefly showing the ink-jet recording device of the above-mentioned construction, there will be described the operation of such device.

In recording, output pulse voltage from a pulse generator 30 is applied to the piezoelectric element 18 through the electrode plates 13 and 19. The central portion of the piezoelectric element 18 is distorted together with the electrode plate 13 so as to project in the direction of arrow A in accordance with the applied voltage, thereby applying great instantaneous pressure to the ink 12 in the ink chamber 11. Although this pressure, produced by the distortion of the piezoelectric element 18, is applied to the ink inlet port side, most of such pressure is put on the ink outlet port side because of the high resistance property of the porous filter 14, and ink is jetted toward recording paper by means of the nozzle 17.

Subsequently, when the impression of the pulse voltage is ceased, the central portion of the piezoelectric element 18 is restored so as to project in the direction of arrow B to produce negative pressure in the ink chamber 11, thereby causing ink from the ink source 31 under pressure H to enter into the ink chamber 11 through the filter 14. Thus, the ink jetting from the nozzle 17 and the ink supply to the ink chamber 11 are repeated to achieve desired recording on the recording paper.

The filter 14 has given resistance against a stream of ink flowing through the same. If such resistance is too great, a given quantity of ink cannot be supplied to the ink chamber 11 even though the quantity of ink in the ink chamber is decreased. In order to avoid this, therefore, the given pressure H must be applied to the ink source 31. The pressure H must be greater than resisting force against the inflow of ink into the ink chamber 11 but smaller than resisting force produced by surface tension at the ink outlet port 16 and the nozzle 17. Such relation between the pressure H and the resisting force by the surface tension is required in order to prohibit ink from being jetted when no pressure is applied by the piezoelectric element 18.

If the resisting force of the filter at ink supply is F and the force by the surface tension is T, force P to be applied to the ink chamber 11 side from the ink source to which the pressure H is applied continually is given as follows:

$$F<P<T.$$

More specifically, if the inside diameter of the ink outlet port is 2r and the surface tension of ink is t, then the force produced by the surface tension will be $2\pi r\cdot t$. Meanwhile, if the pressure continually applied to the ink is H, force produced thereby at the outlet port will be $\pi r^2\cdot H$.

Accordingly, if the latter ($\pi r^2\cdot H$) is greater than the former ($2\pi r\cdot t$), we obtain $H>2t/r$. If H is greater than $2t/r$, ink will flow out unnecessarily. If the inside diameter (2r) of the outlet port is 50 μm and the surface tension (t) of water ink is 60 dyn/cm, for example, the pressure to be continually applied to the ink must be lower than 50 cm·$H_2O$.

Meanwhile, if droplets of ink with a diameter of 84 μm are spouted from the outlet port by a pulse signal of a rectangular shape of a 50 μs width, the quantity of an ink drop is approximately $2.7\times10^{-7}$ cc. In such case, if a sintered stainless steel plate of 0.2-mm length, 5-μm pore diameter and 1,000 pores is used for the filter and the pressure H is set to a 5 cm·$H_2O$, ink can be supplied through the filter for a time of 600 μs. When a stationary pressure is set to more than 5 cm·$H_2O$, ink may be supplied for a shorter time. Thus, the pressure H need satisfy 5 cm·$H_2O$<H<50 cm·$H_2O$.

Ink is jetted with good efficiency where resistance Rn at the outlet port is smaller than resistance Rf at the filter.

Where the properties of the outlet port and the filter are tabulated as under, the ratio between the resistances Rn and Rf may be calculated as follows:

(TABLE)

$$\frac{Rn}{Rf} = \frac{rf^4\cdot ln \times 1{,}000}{rn^4\cdot lf} = \frac{1}{40}$$

| | Outlet port | Filter |
|---|---|---|
| Length (l) | 50 μm | 200 μm |
| Inside diameter of pore (2r) | 50 μm | 5 μm |
| Number of pore | 1 | 1,000 |

In this case, the resistance of the filter is 40 times as great as the resistance of the outlet port, so that ink may be jetted efficiently.

Actually, when a piezoelectric element of 0.2-mm thickness and electrode plates formed of disk-like metal plates of the same thickness and 20-mm diameter, as well as outlet port and filter with the tabulated properties, were used, we were able to obtain a stream of droplets of ink at a frequency of 1.6 kHz or more by applying constant force of 10 cm·$H_2O$.

Although the filter used with the above-mentioned embodiment is formed of sintered stainless steel, it is not limited to such material, and may be formed of any other material provided it is porous and highly resistant to ink.

Figure 5:
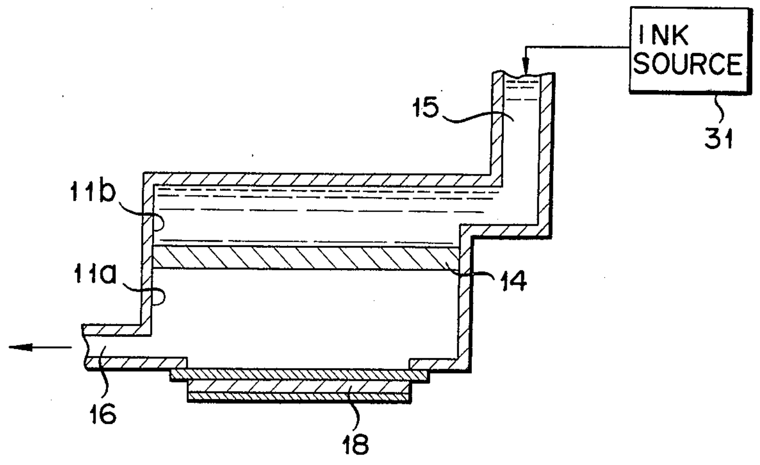
FIG. 5 is a schematic diagram showing an ink-jet recording device according to another embodiment of the invention.

The filter, which is disposed at the inlet port near the ink chamber in the above embodiment, may otherwise be separated from the ink chamber. In this case, however, the filter must be within easy reach of the pressure produced by the distortion of the piezoelectric element. Alternatively, the filter may be disposed directly in the ink chamber. In this case, it is to be understood that the ink outlet port 16 need be located at an ink chamber section **11*a* between the piezoelectric element 18 and the filter 14, and that the ink inlet port 15 need be located at another ink chamber section 11*b*, as shown in FIG. 5**.

Thus, in the ink-jet recording device according to this invention, a porous filter is disposed in an ink passage which is formed of an ink chamber and inlet and outlet ports, and the ink passage is separated into first and second passage sections which can communicate with each other by means of the porous filter. The first passage section is connected to an ink source, while the second passage section is connected to the outlet port from which ink is jetted out by pressurizing means (piezoelectric element in the embodiments). In the first embodiment, the porous filter is located at the inlet port near the ink chamber, so that the first passage section is composed of the greater part of the inlet port. In the second embodiment, the porous filter is disposed inside the ink chamber, so that the first passage section is formed of the whole inlet port and part of the ink chamber.

The above-mentioned ink-jet recording device may be applied not only to a pressure-pulse type system but also to a pressurization-oscillation type system.

What is claimed is:

1. An ink-jet recording device comprising:

a container having an ink chamber for storing an ink body, having an opening formed on one side;

pressurizing means provided on one side of the container for applying pressure to the ink body in the ink chamber in accordance with an electric signal applied thereto;

a porous filter disposed inside the ink chamber to face the pressurizing means in a predetermined distance to divide the ink chamber into first and second chamber sections and directly subjected to the pressure applied by the pressurizing means;

an ink outlet port opening at the first chamber section between the pressurizing means and porous filter;

an ink inlet port including an opening communicated with the second chamber section and having a smaller diameter than that of the second chamber section; and an ink source connected with the inlet port and supplying ink into the ink chamber through the inlet port.

2. An ink-jet recording device according to claim 1 wherein the opening of said inlet port is located on the other side of the container to face the porous filter.

3. An ink-jet recording device according to claim 1, wherein said pressurizing means includes a piezoelectric element and first and second electrode plates disposed respectively on both sides of said piezoelectric element.

4. An ink-jet recording device according to claim 3, wherein said container body has an opening which opens into said ink chamber, said first electrode plate closing said opening.

5. An ink-jet recording device according to claim 4, wherein said porous filter is a sintered stainless steel plate.

* * * * *